Oct. 16, 1934.   C. A. MATSON   1,977,588
REVERSE BRAKE
Filed Jan. 20, 1933   2 Sheets-Sheet 1
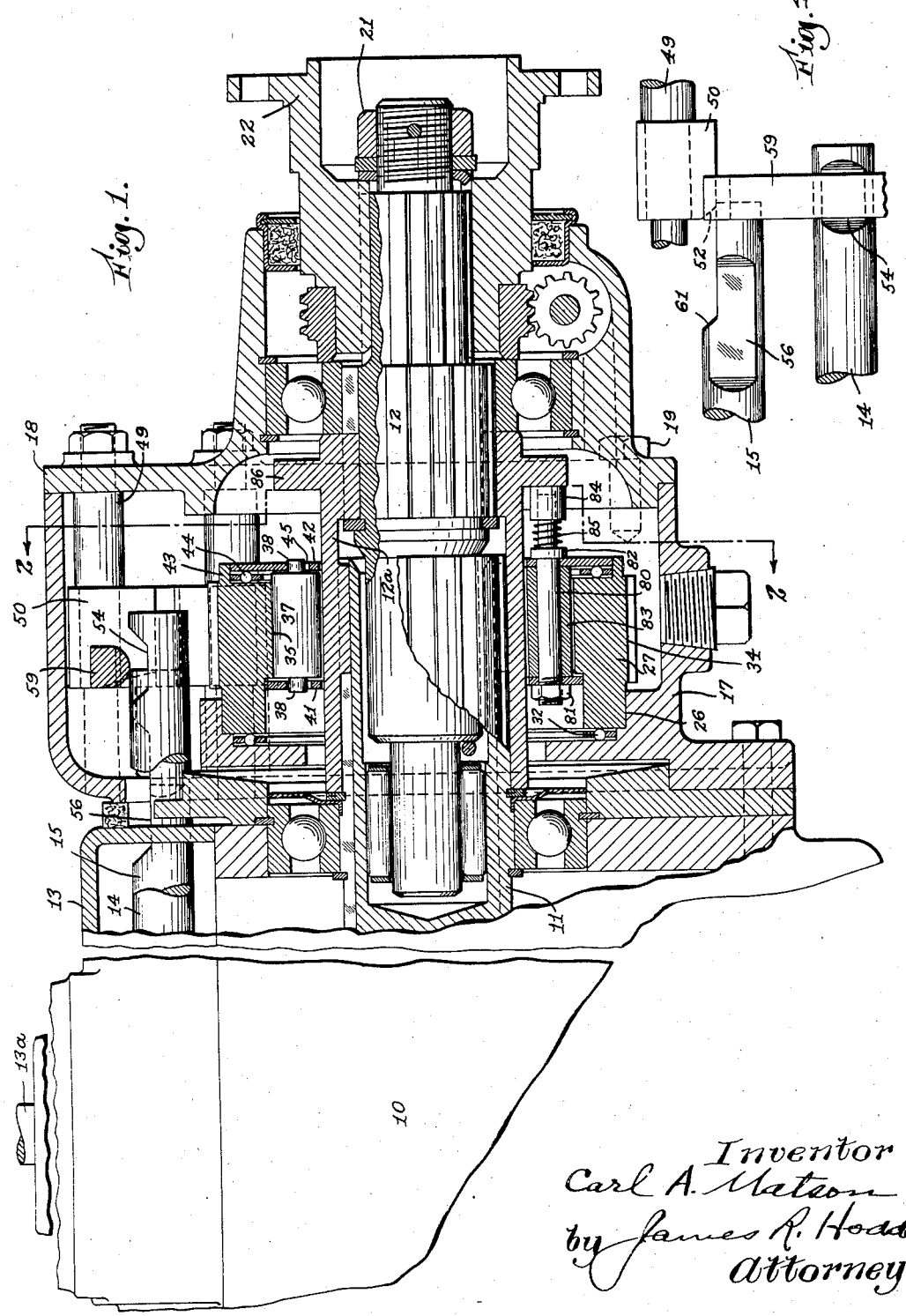

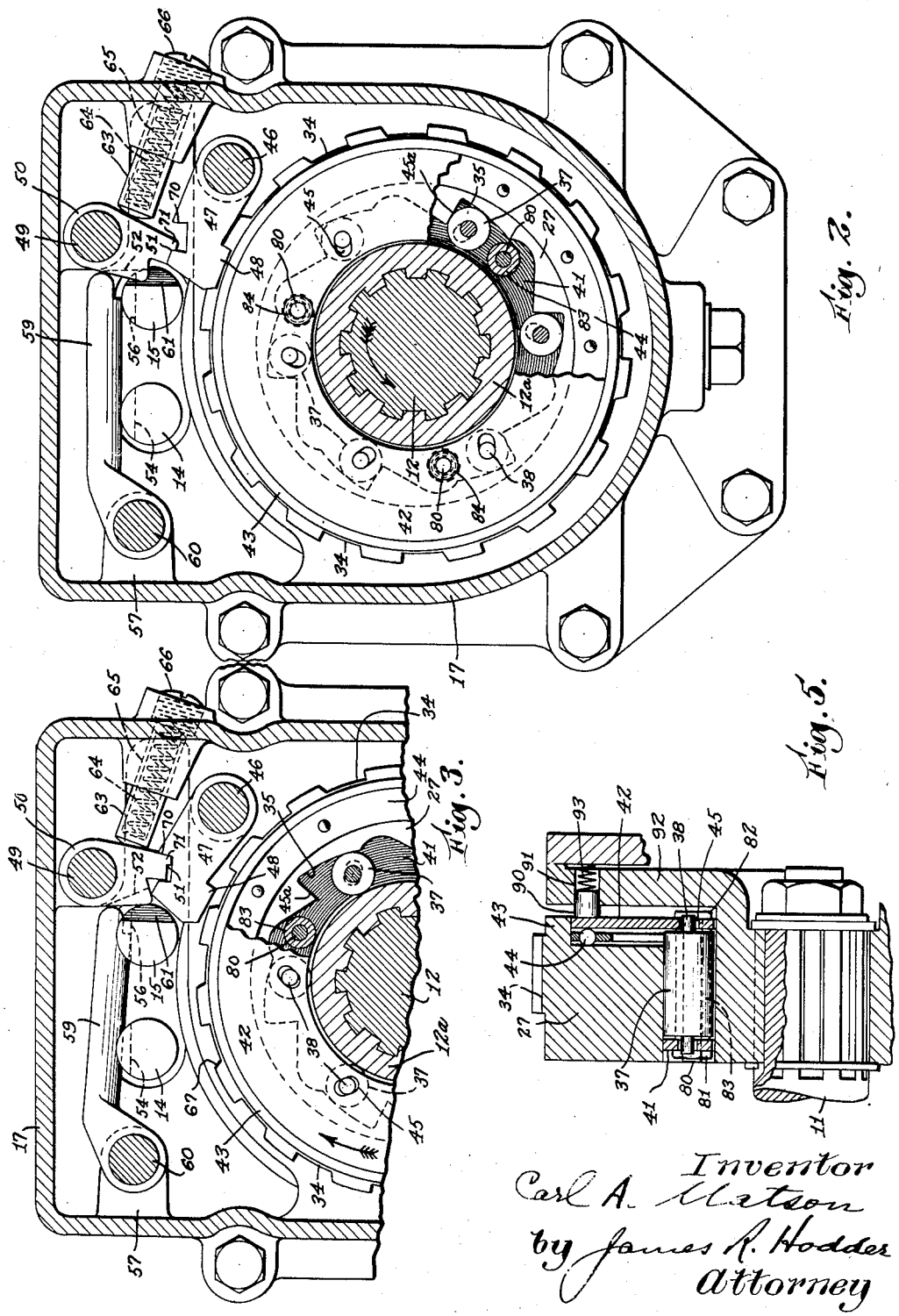

Patented Oct. 16, 1934

1,977,588

UNITED STATES PATENT OFFICE 1,977,588

REVERSE BRAKE

Carl A. Matson, Lynn, Mass., assignor to The Matson Company, Concord, N. H., a corporation of New Hampshire Application January 20, 1933, Serial No. 652,636

5 Claims. (Cl. 192—4)

My present invention relates to a brake mechanism, and more particularly to a novel and improved automatic reverse brake for automobiles or other mechanical devices.

I have heretofore devised several distinct mechanisms for accomplishing the highly desirable purpose of preventing inadvertent retrograde movement of a motor vehicle, particularly on inclines, and the device of this application pertains to this same class or type of mechanisms.

An important object of the present invention resides in the provision of an automatically actuated brake reverse brake for motor vehicles or the like, which is simple to manufacture and install, and is applicable either to existing automobiles, or may be incorporated as a component part thereof during manufacture.

Another feature of my invention resides in the fact that but slight change or alteration is required when applying my device to an existing machine.

Another object of the present invention resides in the fact that my present device is highly efficient in operation, positive in use, rugged, durable and long lived, while yet possessing the advantages of simplicity and economy.

Another feature of the present invention resides in the fact that a machine equipped with my device may be moved rearwardly, either under its own power, in which event the brake mechanism is automatically rendered inoperative, or by hand, in the latter instance by placing the normally operative brake mechanism in an inoperative condition or position, this being accomplished by simply moving the gear shift lever to reverse position, and thence to neutral position.

Another and important feature of the present invention resides in the fact that the locking instrumentalities, preferably rollers, are held out of idling engagement during forward movement of the vehicle to which the device is applied.

The importance of this latter-mentioned feature will be instantly apparent to and understood by those skilled in this art, as the prevention of idling of the locking elements during movement of the device in a forward direction results in the total elimination of the major portion of the friction and wear which would otherwise be imposed upon these locking elements or devices.

I accomplish this last mentioned and valuable feature by the provision of novel means, associated with the locking elements, which in this instance are illustrated as rollers, and which means is so constructed and arranged as to move said rollers, on movement of the vehicle in a forward direction, to the large end of the wedge chambers, the movement of said rollers being in the same direction of movement as their associated elements, thus removing them from contact with the fixed part of the device and preventing their idling during said forward movement, thus eliminating chattering, friction and wear, and greatly increasing the efficiency, positiveness and life of my novel device.

A further feature of the present invention resides in the provision of a novel member which I have herein termed a ratchet ring, and its associated parts, as the normally fixed part of my novel reverse brake mechanism. This ratchet ring is normally restrained from rotation by means of a novel pawl and latch mechanism which will be hereinafter more fully described.

As a further novel feature of my invention, I mount this ratchet ring upon a member fixed to a rigid part of the casing or housing for my device, thus still further eliminating wear which would ordinarily occur, and also reducing the likelihood of inadvertent rotation of said ratchet ring.

Another object of my invention resides in the construction and arrangement of the locking roller carrying means.

Other objects and features of the invention reside in the particular construction and arrangement of this device and the parts thereof, and all of the foregoing, together with other objects and features of the invention, will be hereinafter more fully pointed out, described and claimed.

Referring to the drawings illustrating a preferred embodiment of the present invention, Fig. 1 is a longitudinal vertical sectional view of my novel device applied to an automobile transmission;

Fig. 2 is a vertical sectional view on the line 2—2 of Fig. 1;

Fig. 3 is a fragmentary vertical sectional view of my device in the position assumed during reverse movement of the device;

Fig. 4 is a partial plan view of the gear shift rods and locking lever; and

Fig. 5 is a fragmentary vertical sectional view of a modification.

Referring now to the drawings, for a particular description of the invention, its construction, assembly and operation, 10 designates a transmission casing provided with the usual transmission gearing and having rotatably mounted therein and extending through the rear end thereof a transmission shaft 11.

In the drawings this shaft is illustrated as comprising the parts 11 and 12, united by the sleeve 12a, but for simplicity and clarity I have referred to these three elements as a unit, designating them as the transmission shaft or driven member, as in some forms of transmission mechanism they would in fact be formed as a single element. Mounted on the top of the transmission casing 10 is a cover 13, in which is pivotally mounted the gear shift lever 13a for operating the slide rods 14 and 15 associated with the speed change gearing within the casing 10. Attached to the rear of the transmission casing 10 is a casing 17 open at the rear end and provided with a cover 18 that is secured in position by bolts 19.

Secured to the splined end of the transmission shaft by a nut 21 is one member 22 of the usual knuckle joint. The casing 17 is provided with a seat 26 for a ratchet ring 27. Interposed between the ratchet ring 27 and the inner wall of the casing 17 is an anti-friction bearing 32, so that the ring 27 and its movement will not be affected by any frictional resistance which might otherwise occur.

The ratchet ring 27 has a substantially close fit in the seat 26, although there is a running clearance therebetween, and this ratchet ring is provided, on its periphery, with a plurality of spaced notches 34. Symmetrically arranged within the ratchet ring 27 are recesses 35, said recesses forming, with the periphery of the sleeve 12a, substantially wedge-shaped or tapered chambers, in each of which is rotatably mounted a roller 37.

As will be noted from an inspection of Fig. 1, each roller 37 is provided with a short projecting stud 38 on each side thereof. Positioned at each side of the rollers 37 are rings 41 and 42, hereinafter referred to as a carrier, the ring 42 being of greater area than the ring 41 and projecting within the flange 43 of the ring 27, an anti-friction bearing 44 being interposed between the ring 42 and the ratchet ring 27.

The rings 41 and 42 are provided with recesses or slots 45, corresponding in number to the rollers 37. The studs 38 are located in these slots 45 in the rings 41 and 42. Said slots, as clearly illustrated in the drawings, are arranged at an angle with respect to the faces of the shoulders 45a, the purpose of which will be hereinafter more fully explained.

Pivoted at 46 is a lever 47 having thereon a pawl 48 and located above the pivot 46 is a second pivot 49 on which is mounted a lever 50 having a latch 51, and also being provided with a cam surface 52.

The slide rod 14 is provided with a short cam groove 54, and the slide rod 15 is provided with an elongated cam groove 56, in which rests the lower rounded surface of the arm 59, which arm is pivoted on the bracket 57 in the casing 17 at 60. The rod 15 is also provided with a cam surface 61, as clearly shown in Fig. 4.

Carried by the rings 41 and 42 are several rods 80, one end of each of said rods projecting through the ring 41 and being threaded to receive a nut 81, the other end of each of said rods projecting through the ring 42 and having a collar 82. A spacing collar 83 surrounds each rod, and the nuts 81 and collars 82, together with the space collars 83, hold the rings 41 and 42 in predetermined spaced relation. The unthreaded ends of the rods 80 continue beyond the rollers 82, and each carries on its outer end a slidable collar or sleeve 84, a coiled spring 85 being interposed between each collar 82 and each sleeve 84, surrounding the rods 80. These sleeves 84 in turn abut against the flange 86 on the sleeve 12a.

Assuming the device to have been constructed and arranged as above described, with the parts in the position in Fig. 2 and with the transmission shaft 11 and flange 86 rotating in a counterclockwise direction, as illustrated by the arrow in Fig. 2, in order to cause forward movement of the vehicle to which the device is assumed to be attached, such forward movement will be effected independently of the ratchet ring 27, one of the notches 34 of said ring being engaged by the pawl 48, and said pawl in turn being engaged by the latch end 51 of the lever 50, said lever being forced to the position illustrated in Fig. 3 by the plunger 63 controlled by the spring 64 confined in the recess 65 between the plunger 63 and the screw plug 66. Such counter-clockwise movement or rotation of the member 22 will tend to force the rollers 37 counterclockwise, as viewed in Fig. 2, or toward the large end of the wedging chambers 35. This movement of the rollers 37 toward the large end of the chambers 35 is assisted by the flange 86, the sleeves 84 being pressed thereagainst, and thus moving the rings 41 and 42, and hence the rollers carried thereby in the direction of rotation of the shaft 11. The movement of the rollers 37 counterclockwise, viewing Fig. 2, will cause the studs 38 to ride in the slots 45, thus moving said rollers 37 out of contact with the sleeve 12a. This movement is positively completed on engagement of the rollers 37 with the shoulders 45a, because of the difference in angles between said shoulders and said slots 45. Thus entire elimination of idling contact of the rollers 37 with the sleeve 12 during forward movement of the device is effected.

This elimination of idling contact or engagement on the part of the rollers 37 removes the greatest factor of wear therefrom, and thus increases and prolongs the life of the mechanism to a material degree.

Now assume that with the device in the position illustrated in Fig. 2, the machine in which it is incorporated is stopped on an incline. Immediately upon stopping, there would tend to be a retrograde movement of the vehicle, turning the shaft 11 and flange 86 in a clockwise direction as indicated by the arrow in Fig. 3. However, the ratchet ring 27 being held against movement, the movement of the rings 41 and 42 by the flange 86 and sleeves 84, together with the clockwise movement of the sleeve 12a, will force the rollers 37 toward the small end of their respective chambers and toward the low ends of the slots 45, wedging said rollers between the inner wall of said chamber and the sleeve 12a, effectually preventing any inadvertent reverse movement of the vehicle.

Now assume that it is desired to move the device in a reverse direction, such as by motion under the vehicle's own power. The gear shift lever 13a is manipulated to reverse position, which movement will cause a movement of the slide rod 15 to the rear, and an engagement of the cam face 61 of said rod with the cam face 52 of the lever 50, moving said lever about its pivot 49 in a counter-clockwise movement, against the tension of the spring-pressed plunger 63, which movement will free the latch 51 from the lever 47. Thereupon, movement of the shaft 11 and rollers 37 in a clockwise direction, as indicated by the arrow in Fig. 3, will also tend to move the ring 27; and when this movement occurs, the cam face 67 of the particular notch 34 in engagement with the pawl 48 will force said pawl out of said notch, to the position illustrated in Fig. 3.

This will permit reverse movement of the device, as will be readily understood and appreciated.

Upon such movement taking place, when the pawl 48 is displaced from its notch 34, the outer end of the arm 59 will drop into the cam grooves 54 and 56, to normal position, and be engaged by the lever 50, as illustrated in Fig. 3, holding the pawl 48 out of engagement with the ring 27. Thus, when the gear shift lever 13a is moved from reverse position to neutral, the device will remain in the position illustrated in Fig. 3. The elongated slot 56 permits movement of the slide rod 15 to the rear without effecting any vertical movement of the arm 59, as will be appreciated.

Now assume that the device is in neutral, and that it is desired to move to a forward speed. On movement of the gear shift lever 13a into first or low gear, the slide rod 15 will be moved forwardly, and the arm 59 will be engaged by the rearmost wall of the elongated cam groove 56, raising the arm 59 to the position illustrated in Fig. 2. This permits the plunger 63 to force the lever 50 in a clockwise rotative movement, the pawl 48 falling to a position against the outer periphery of the ring 27. If at this instant, the pawl 48 is in register with one of the notches 34, it will engage said notch and the latch 51 will engage said pawl to hold the same therein. If, however, the pawl 48 is not in register with a notch 34, upon the slightest retrograde movement of the vehicle, the ring 27 will be rotated in a clockwise direction, and as soon as the next succeeding notch registers with the pawl 48, engagement thereof will take place and further retrograde movement be restrained. Thus the device, in any of the forward speeds, is constantly in operative position, it being necessary to move the gear shift lever 13a to reverse position in order to render the braking device inoperative.

It will be appreciated that when the gear shift lever 13a is being moved from the neutral position, with the device in the position illustrated in Fig. 3, the initiation of movement toward a forward speed will place the device in operative position, without any material time interval being required to effect this result.

In order to eliminate the necessity of first moving the gear shift lever into or toward reverse position, and then returning the same to neutral before the vehicle can be moved forwardly or backwardly, as, for example, on the floor of a garage, I provide, on the lever 47, a lug 70 in register with a lug 71 on the lever 50. Thus, when the rod 15 is moved rearwardly, as will be the case when the gear shift lever 13a is moved toward reverse position, the cam face 61 engaging the cam face 52 on the lever 50, will swing said lever 50 about its pivot 49, bringing the lug 71 into engagement with the lug 70 and rocking the lever 47 about its pivot 46 until the latch 48 is raised from its cooperating notch 34 in the ratchet ring 27. This movement, of course, will be against the pressure of the spring pressed plunger 63, and as the lever 50 is rocked in a counterclockwise direction, the arm 59 will drop to its normal position, as clearly illustrated in Fig. 3.

Thereupon, whether the gear shift rod 15 is retained in the position illustrated in Fig. 3, or whether it is returned to neutral position, the latch 48 will be held out of engagement with the ratchet ring 27 by means of the lever 50 bearing against the outer side of the rod 15. It will thus be appreciated that the lugs 70 and 71 afford means to positively disengage the locking elements comprising the latch 48 and the notches 34, rather than relying upon the camming actions of the cam faces 67 on reverse rotation of the ring 27, a feature that will be instantly apparent to and understood by those skilled in this art.

This feature also eliminates difficulties which might possibly arise when relying upon the camming action to disengage the latch 48. For example, if the gears should not be exactly in register, it would frequently be difficult to effect rearward movement of the vehicle in order to exert such camming action. The novel feature just above described, however, entirely obviates and eliminates this difficulty.

Furthermore, under some circumstances, such, for example, as when a vehicle is rolling rearwardly, and the operator moves the gear shift lever 13a to one of the forward speeds during such rearward movement, damage, injury, and considerable shock are likely to be caused by the instantaneous meshing or engagement of the latch 48 with one of the notches 34 as the ring 27 is rotating in its reverse direction. This is obviated however, by mounting the ratchet ring 27 on a solid portion of the casing, as aforesaid.

As above explained, the said latch 48 will remain in the notch engaged thereby until the gear shift lever 13a is again moved toward reverse position.

It will thus be appreciated that I have devised a simple, positive, serviceable, and efficient, automatically operable reverse brake mechanism, and since I believe that the same is novel, I have therefore claimed said device broadly in this application.

In Fig. 5 I have illustrated a slight modification, wherein the sleeves 84 are eliminated, and in place thereof I position plungers 90 in recesses 91 in the member 92, which in this instance comprises one of the sections of the universal joint.

Springs 93 in said recesses force said plungers outwardly against the face of the ring 42 and these plungers 90 function in exactly the same manner as the sleeves 84, permitting slippage of the member 92 thereby when the ring 27 is locked against movement. In this modification, the rings 41 and 42 are united by rods in the same manner as illustrated in Fig. 1, with the exception of the extended portion of said rods, the springs surrounding the same, and the sleeves 84, as will be readily understood.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a device of the kind described, the combination of a driven member, means for applying power thereto to rotate the same in either direction, a ratchet ring surrounding said driven member, said ratchet ring having a wedge-shaped recess therein, a carrier surrounding said driven member and having inclined guiding slots therein adjacent to said recess, a locking roller located in said recess, studs on said roller riding in said slots, said ratchet ring cooperating with said locking roller to prevent rotation of the driven member in a reverse direction, and resiliently controlled means to hold said locking roller out of engagement with the driven member on rotation of the driven member in a forward direction.

2. In a device of the kind described, the combination of a driven member, means for applying power thereto to rotate the same in either direction, a ratchet ring surrounding said driven member, said ratchet ring having a wedge-shaped recess therein, a carrier surrounding said driven member and having inclined guiding slots therein adjacent to said recess, a locking roller located in said recess, studs on said roller riding in said slots, said ratchet ring cooperating with said locking roller to prevent rotation of the driven member in a reverse direction and a shoulder in said recess having a different angle of inclination than said slots to cooperate in holding said locking roller out of engagement with the driven member on rotation of the driven member in a forward direction.

3. In a device of the kind described, the combination of a driven member, means for applying power thereto to rotate the same in either direction, a ratchet ring surrounding said driven member, said ratchet ring having a wedge-shaped recess therein, a shoulder at one end of said recess, a carrier surrounding said driven member and having inclined guiding slots therein adjacent to said recess and angularly arranged with respect to said shoulder, a locking roller located in said recess, studs on said rollers riding in said slots, said ratchet ring cooperating with said locking roller to prevent rotation of the driven member in a reverse direction, and resiliently controlled means carried by said carrier and cooperating with said shoulder to hold said locking roller out of engagement with said driven member on rotation of the driven member in a forward direction.

4. In a device of the kind described, the combination of a driven member, means for applying power thereto to rotate the same in either direction, a ratchet ring surrounding said driven member, said ratchet ring having a wedge-shaped recess therein, a shoulder at one end of said recess, a carrier surrounding said driven member and having inclined guiding slots therein adjacent to said recess and angularly arranged with respect to said shoulder, a locking roller located in said recess, studs on said rollers riding in said slots, said ratchet ring cooperating with said locking roller to prevent rotation of the driven member in a reverse direction, and resiliently controlled means associated with said carrier and cooperating with said shoulder to hold said locking roller out of engagement with said driven member on rotation of the driven member in a forward direction, said resiliently controlled means being frictionally engaged by the driven member and under the direct rotating influence thereof.

5. In a device of the kind described, the combination of a driven member, means for applying power thereto to rotate the same in either direction, a ratchet ring surrounding said driven member, said ratchet ring having a wedge-shaped recess therein, a carrier surrounding said driven member and having inclined guiding slots therein adjacent to said recess, a locking roller located in said recess, studs on said rollers riding in said slots, a fixed abutment adjacent to said driven member, said ratchet ring being rotatably mounted on said abutment and projecting over and surrounding said driven member and cooperating with said locking roller to prevent rotation of the driven member in a reverse direction, and resiliently controlled means associated with said carrier to hold said locking roller out of engagement with said driven member on rotation of the driven member in a forward direction.

CARL A. MATSON.